United States Patent [19]

Williams

[11] Patent Number: 4,730,790
[45] Date of Patent: Mar. 15, 1988

[54] WASTE MATERIAL CLASSIFYING AND REDUCING APPARATUS

[75] Inventor: Robert M. Williams, Ladue, Mo.

[73] Assignee: Williams Patent Crusher and Pulverizer Company, St. Louis, Mo.

[21] Appl. No.: 372

[22] Filed: Jan. 5, 1987

[51] Int. Cl.⁴ .......................................... B02C 13/286
[52] U.S. Cl. ...................................... 241/81; 241/82; 241/189 R
[58] Field of Search ........................ 209/552, 671, 672; 241/81, 80, 97, 189 R, 186 R, 48, 57, 73, 82, 79.1

[56] References Cited

U.S. PATENT DOCUMENTS

| | | | |
|---|---|---|---|
| 3,702,682 | 11/1972 | Williams | 241/81 X |
| 3,934,826 | 1/1976 | Graveman | 241/81 |
| 4,288,038 | 9/1981 | Williams | 241/81 X |
| 4,339,085 | 7/1982 | Williams | 241/81 X |
| 4,479,581 | 10/1984 | Kelyman | 209/67 L X |
| 4,586,658 | 5/1986 | Eisenegger | 241/81 X |

FOREIGN PATENT DOCUMENTS 2094662 9/1982 United Kingdom ................. 241/81

Primary Examiner—Mark Rosenbaum
Attorney, Agent, or Firm—Gravely, Lieder & Woodruff

[57] ABSTRACT

Apparatus for processing waste material made up of a mass of comingled abrasive shards and the like, uncrushable and shreddable classes of waste so that the subsequent individual handling of that waste material is made more efficient. The apparatus combines in a common structure rotary disc screen for initially separating the waste material so that the shards and abrasive classes of material are able to drop through the rotary disc screen while the remainder of the material is delivered to the apparatus for gravitational classification as between the uncrushables and shreddables in response to air flow in a controlled atmosphere to promote gravity fall-out separation of the heavier components from the lighter components.

2 Claims, 3 Drawing Figures

WASTE MATERIAL CLASSIFYING AND REDUCING APPARATUS

BACKGROUND OF THE INVENTION

1. Field of the Invention

This invention relates to apparatus for processing waste material containing components that vary from uncrushable like metallic waste to fabric and plastic waste and intermediate waste of an abrasive character.

2. Description of the Prior Art

The most pertinent prior art is represented by my earlier U S. Pat. Nos. 3,702,682 of Nov. 14, 1972, 4,288,038 of Sept. 8, 1981, 4,337 900 of July 6, 1982, and 4,339,085 of July 13, 1982. Each of these patents discloses apparatus for separating waste materials having materially different characteristics. Materials of this character are typical of domestic and industrial waste containing abrasive substances, rags, glass, metallic objects, discarded paper and cardboard containers, and a whole host of objects that can be processed together or that can be separated out on the basis of specific gravity properties.

Prior art of the above character embodies processing means which vibrates the waste material so that it sorts itself into similar and dissimilar components to make the further processing more responsive to the apparatus called upon to handle such materials. In addition to vibratory devices, the prior art includes a variety of rotary disc screens which, instead of functioning principally on separation by vibration, present a bed of discs having formed peripheral edges which cause the trash to undulate. The discs are mounted to interleave to form a bed having spaces between discs through which desired components of the waste may fall, while larger components travel along the bed to a discharge end. The rotary screen prior art is represented by Bray 622,035 of Mar. 28, 1899, Dunbar 2,966,267 of Dec. 27, 1960, Kuntz 2,974,793 of Mar. 14, 1961, Conway et al 3,028,957 of Apr. 10, 1962, and Wahl et al 4,037,723 of July 26, 1977. In addition applicant has a copending application, Ser. No. 772,041, now U.S. Pat. No. 4,658,964 of Apr. 21, 1987 on a Rotary Disc Screen filed Sept. 3, 1985.

BRIEF DESCRIPTION OF THE INVENTION

An important object of the present invention is to provide apparatus that will be able to process an unclassified collection of waste materials, and extract from that collection of waste material components regarded as abrasive in character, components regarded as uncrushable and difficult to grind, such as metallic bodies, and components which can be reduced by grinding and shredding.

A further important object is to bring together the necessary processing equipment for the handling of widely differing waste materials in one organized composite apparatus.

The invention can have several different arrangements of processing equipment. The differing arrangements include a rotary disc screen which intially processes the arriving waste to separate abrasive shards and granular components such as grit, sand, broken glass and the like. The waste material freed of shards and abrasive components is subjected to gravity separation of waste to remove the hard to reduce materials such as metallics. Finally, the equipment includes a mill suitable for reducing the remainder of the waste to a desired condition for further handling and a subsequent recycling to the disc screen of material incompletely reduced so as to be unable to pass through the usual grate on at least a first try.

In its broad aspects, the present apparatus combines components which function to yield from a common unclassified mass of waste material different subclasses of waste, such as abrasive, uncrushables and shreddables.

BRIEF DESCRIPTION OF THE DRAWINGS

The waste material classifying and reducing apparatus has been disclosed in presently preferred embodiments, wherein.

DETAILED DESCRIPTION OF THE EMBODIMENTS

Figure 1:
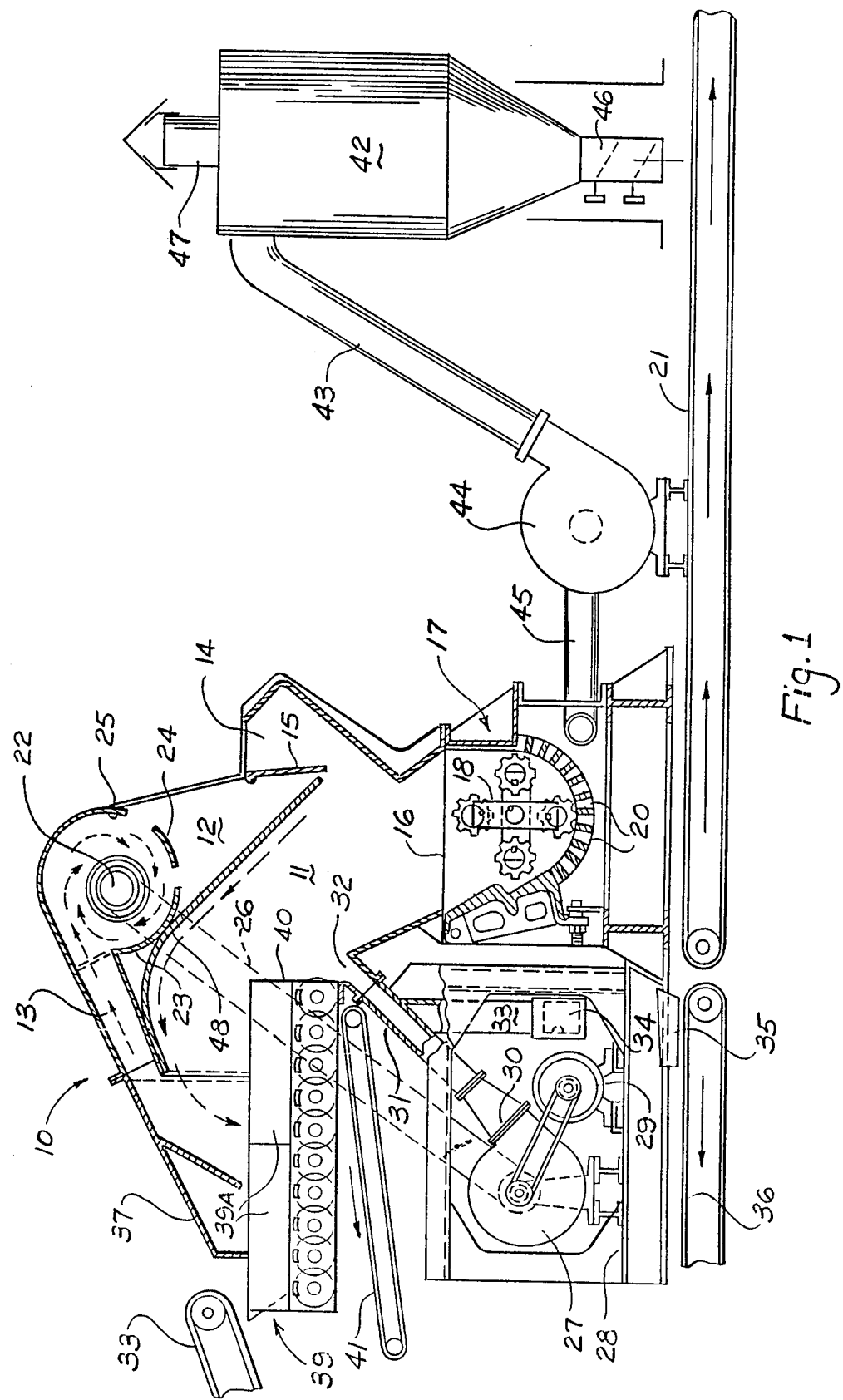
FIG. 1 is a schematic side elevation of the waste classifying components of a composite system for handling the type of waste material that is encountered from domestic and commercial sources.

Referring now to FIG. 1 of the drawings, it can be seen that the material classifying apparatus includes a sheet metal structure 10 which defines a first internal chamber 11 and adjacent to that internal chamber 11 there is a second chamber 12 which is placed in communication with the internal chamber 11 through a flow passage 13 at the upper side, and a discharge passage 14 at the lower side, which passage 14 is controlled by a flop gate 15 that is suitably counterbalanced to seek a closed position until material collecting in the second chamber 12 overcomes the counterbalance force to open the flop gate 15 and return that collected material toward the bottom outlet 16 of the internal chamber 11. The bottom outlet 16 aligns with the inlet of a shredder assembly 17 which is in the form of a ring type hammer mill having a rotor 18 equipped with grate bars 20 which are suitably spaced to control the size of the particles reduced in the mill 17.

As indicated, the reduced material falls onto a suitable belt conveyor 21 for transport to a suitable collecting location.

It will be observed that the second chamber 12 is provided with an outlet port 22 positioned within spaced walls 23, 24 and 25 which surround the outlet 22. The outlet 22 is connected to a conduit 26 which is directed to be connected into the suction side of a blower 27 mounted in a suitable supporting structure 28 adjacent the mill assembly. The blower, driven by a motor 29 is provided with an outlet 30 in the form of a conduit 31 which has an outlet opening 32 directed into the internal chamber 11 so as to deliver air velocity into that chamber for a purpose that will be referred to presently. It is noted that a material trap 33 opens into the side of the air flow conduit 31, and the bottom of the trap 33 is provided with a cleanout door 34 which may be counterbalanced so as to open when a collection of material overcomes the counterbalance. The material collecting in the trap 33 is periodically discharged onto a hopper 35 which directs such material onto a belt conveyor 36 which carries that material to a place of discharge.

The mill structure is provided with a material receiving hopper 37 which directs incoming material falling from the feed belt 38 into the inlet end of a rotary disc screen assembly 39. The disc screen assembly 39 has sides 39A to channel the incoming material along its upper surface to an outlet end 40 which is located directly above the air flow outlet 32 from the conduit 31. The purpose for locating the disc screen outlet 40 as noted is to allow for heavy particles and components to fall into and through the conduit opening 32 against the air flow and gravitate into the trap 33. The material thus trapped would normally consist of heavy components that do not respond to the air flow and thereby gravitate into the trap 33. The rotary disc screen assembly 39 is employed to provide means for screening out abrasive material that may be in the incoming feed, thereby removing such material from getting into the hammer mill 17 which would increase the rate of wear of the rotary hammers. The thus screened out abrasive material falls onto a belt conveyor 41 for delivery to a suitable collecting station.

It can be seen in FIG. 1 that the mill housing structure 10 is intended to be maintained at sub-atmospheric pressure by a conventional cyclone separator unit 42 which is connected by conduit 43 to a blower 44 having its inlet connected by conduit 45 to the space in the mill below the grate bars 20. Any fine waste material that passes through the grate bars 20 may be sucked up by the blower 44 and delivered to the cyclone separator where that material will fall into an outlet port 46, while the thus cleaned air is exhausted into the atmosphere at the hooded top port 47.

The present organization of apparatus is intended to practice a unique method of subjecting a type of waste material that includes abrasive substances, rags, broken glass, metallic objects, discarded paper and cardboard container, and a whole host of discarded objects that are comingled to form a collection of subject materials that can be characterized as typical of domestic and industrial discarded refuse. The apparatus above described is uniquely designed and rendered operative to sort out from the refuse material the abrasive components at the rotary disc screen assembly 39. It is understood, of course, that the rotary disc screen is provided with a separate driving motor which rotates the discs so as to cause the waste material to seek a relatively thin layer on the upper surfaces of the discs, thereby giving the abrasive material, such as broken glass, an opportunity to fall through the spaces between the various discs and be carried away by the belt conveyor 41. The structure of the rotary disc screen per se is disclosed in my copending application Ser. No. 772,041, filed Sept. 3, 1985 and issued as U.S. Pat. No. 4,658,964 on Apr. 21, 1987, and entitled ROTARY DISC SCREEN AND METHOD OF OPERATION. The drive arrangement disclosed in that copending application is incorporated herein by reference, thereby simplifying the drawing disclosure of this application.

The material that passes off the outlet end 40 of the rotary disc screen assembly is subject to the air flow stream from conduit 31 entering the internal chamber 11 so as to separate the various classes of waste material before such material will gravitate or fall toward the hammer mill 17. Subjecting the waste material to an elutriating air stream which facilitates the separation of the components so that the heavy components will gravitate into the trap 33 thereby avoiding subjecting the hammer mill 17 to the presence of such heavy and usually uncrushable components. The remainder of the components is processed in the hammer mill 17 and any of those components that are not immediately reduced are thrown back into the internal chamber 11 and travel along the curved inner wall 48 which divides the internal chamber 11 and the second chamber 12. The material following the wall 48 will recirculate back to the rotary disc screen assembly 39 and return to the internal chamber 11 for further eventual reduction in the hammer mill 17.

It should now be apparent that the present apparatus is unique in its capability of handling typical waste from domestic and industrial sources to classify such waste material into its general components of abrasive material, heavy uncrushable material and material that will respond to reduction in the hammer mill. As a result the abrasive material is conveyed to a collection source by belt conveyor 41. The uncrushable material discharged from the trap 33 will be delivered to a second belt conveyor 36, and the output from the hammer mill 19 is collected on a belt conveyor 21 which passes under the cyclone separator output 36 to back up the solids separated by the cyclone separator and conveyed to a collection station. While the abrasive components and the uncrushable components are not suitable for use as a fuel, the class of material reduced by the hammer mill 17 may be entirely suitable for use as a fuel which then becomes a commercially usable by-product of the operation of the apparatus disclosed in FIG. 1.

Figure 2:
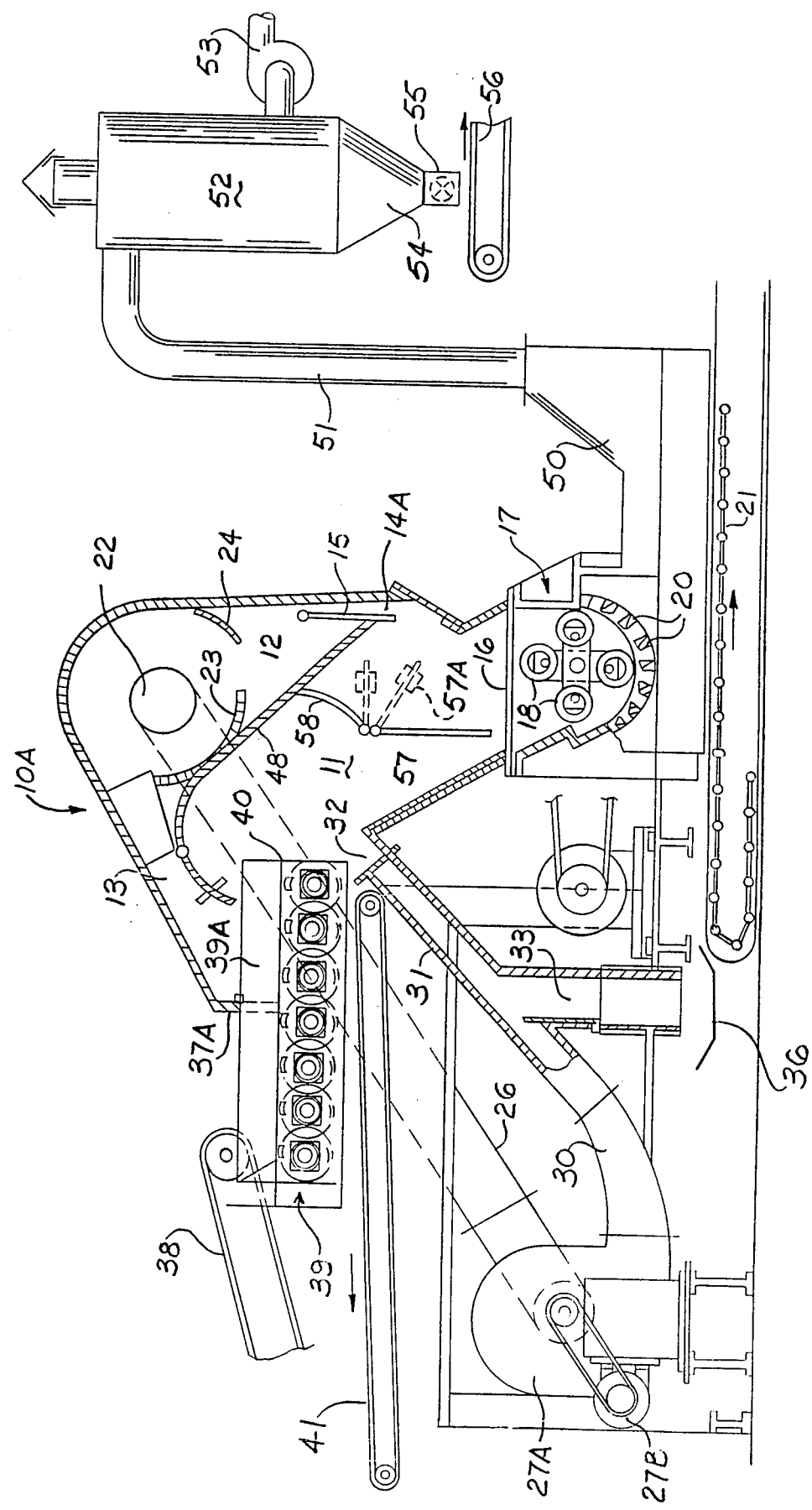
FIG. 2 is a further embodiment of waste handling apparatus, disclosed in a side elevational schematic view.

Turning now to FIG. 2, a further embodiment of waste material apparatus is seen. The structure of this embodiment is similar to that seen in FIG. 1, and common structure will be identified by the same reference numerals. The sheet metal structure 10A of the apparatus is modified in its configuration of the internal chambers 11 and 12, and the passage 13 at the upper side of chamber 11. The chamber 12 is provided with a discharge passage 14A controlled by a flop gate 15 which releases material collecting at that gate. The structure 10A is provided with a hopper 37A for incoming waste material that is delivered by the conveyor 38. The waste material is dumped upon a rotary disc screen assembly 39 having sides 39A to channel the waste toward the outlet end 40.

The chambered structure 10A is mounted over the inlet 16 of the mill 17 so that material can proceed into the mill from chamber 11 and from the passage 14A at the bottom of chamber 12. The chamber 12 has internal vanes 23 and 24 which surround an outlet port 22 opening into a conduit 26 which is connected to the suction inlet of blower 27A driven by a belted motor 27B. The blower outlet elbow 30 is connected into a conduit 31 having an outlet 32 located within the material drop zone off the end of the rotary disc screen 39. The flow of air (commonly an air knife) at the outlet will pick up that portion of the waste material that is responsive to the force of the air and move it into the chamber 11 where it can be dispursed or broken up before it falls into the mill 17. The components of waste falling off the end 40 of the screen 39 that is non-responsive to the air flow will fall into the conduit 31 and descend into the trap 33 and be released onto a collection belt conveyor 36. The mill 17 has ring hammers 18 rotating over grate bars 20 which reduce the waste material to a size that will pass through the spaces between the grate bars 20.

The material reduced by the mill 17 (FIG. 2) will be collected in two ways. The larger components will fall through and be collected by the conveyor 21. The lighter components will be sucked out of the space below the grate bars 20 and pass through the enclosing hood 50 and into conduit 51 to a cyclone 52 where the blower 53 will exhaust the air and the components collected in the bottom 54 will be released through the rotary gate device 55 to a conveyor 56. In this apparatus, the rotary disc screen operates as the first stage separator to extract by gravity the small abrasive and other elements which fall on the conveyor 41. The heavy uncrushables will fall into the trap 33, and the remainder will migrate toward the mill 17. Control over the migratory material in chamber 11 is obtained by gate means 57 and 58 located in the area leading to the mill 17. The gate 57 has an exterior counterweighted arm (seen in broken outline) at 57A so it will partially close off the passage of waste material into the mill 16 until a sufficient weight of material has collected to overbalance the counterweight 57A. After the material has passed gate 57 the gate will return to its starting position to accumulate more material. Material reaching the mill 17 will be reduced by the ring hammers 18 and certain portions will be thrown up past the gate 58 and along the wall 48 to return to the rotary disc screen where it will return at the end 40 thereof and be sorted out so that the heavy uncrushables fall into the trap 33. In the apparatus of FIG. 2, the rotary disc screen initiates the classification process, and the rest of the apparatus will continue that process to result in the uncrushables reaching conveyor 36, crushables being collected on the conveyor 21, and fines collected on conveyor 56 at cyclone separator outlet 55.

Figure 3:
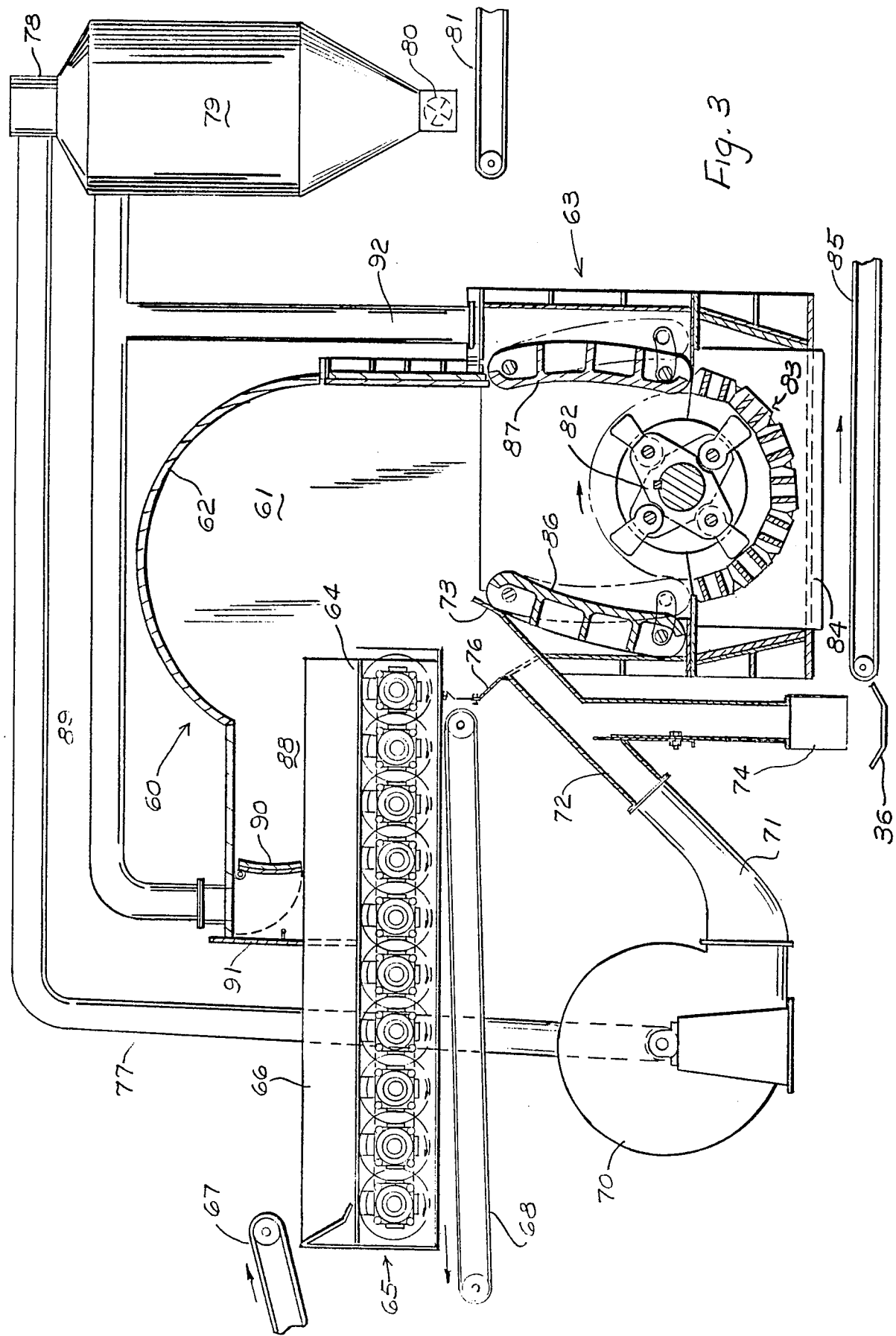
FIG. 3 is a still further schematic side elevational view of waste handling apparatus.

A further embodiment of the present invention is seen in FIG. 3 which varies in certain respects from the foregoing embodiments. In this arrangement the apparatus 60 comprises structure defining a chamber 61 having a shaped wall 62 leading up from a hammer mill 63 and reaching over the outlet end portion 64 of a rotary disc screen assembly 65. The screen has side wall 66 which confines the incoming waste material from the supply conveyor 67 to travel the length of the screen. The screen allows the fine, abrasive material like sand, broken glass, and the like, to fall through and onto a conveyor 68 for movement to a place of disposal (not shown).

The apparatus of FIG. 3 includes an air circulating system made up of a blower 70 having an outlet elbow 71 connected to a conduit 72 which has its outlet 73 located below the screen outlet end 64 so heavy uncrushable material will fall or gravitate into the conduit 72 and fall into a trap 74. The outlet 73 of the conduit is provided with a baffle 76 to close the bottom of the screen 65 to the exterior so air flow into the chamber 61 is not disturbed. The blower 70 has its suction side connected to a conduit 77 extending from the outlet 78 of a cyclone separator 79. The fine material collecting in the separator 79 is released through a rotary valve 80 onto a conveyor 81.

The hammer mill 63 includes the usual hammer rotor 82 operable over a grate 83 made up of a plurality of bars forming the cage in the mill outlet 84 aligned with the conveyor 85. The mill is equipped with breaker plates 86 and 87 capable of being pivoted toward and away from the hammer circle of the rotor 82. These breaker plates are normally adjusted as plate 87 is moved into the hammer path, while plate 86 is moved back to its full line position. This breaker plate setting will allow the rotor hammers to throw difficult material to crush back into chamber 61 where it will usually follow the curved wall 62 and return to the screen assembly 65. The area 88 of the chamber 61 over the screen 65 is connected to an outlet conduit 89 which extends into a connection at the cyclone separator 79. That connection of conduit 89 is protected by a deflector plate 90. The area 88 over the rotary screen is closed by an end wall 91 which can be brought down into close proximity to the rotary screen assembly 65 so that there will be a minimum of blow back.

The circulation system of the assembly is completed by a conduit 92 connected into the mill so as to collect dust and fines and deliver them to the cyclone separator 79 by the conduit 92 being connected into conduit 89 for convenience. As before noted the heavy uncrushables falling into the conduit 72 are diverted into a trap 74 which can be emptied onto conveyor 36 as required.

The foregoing specification has set forth the details of apparatus capable of performing the functions described, and in which improvements have been embodied for effecting the classification process so that preparation of a class of abrasive components can be separated out before reaching the grinding mill. The important feature is seen in the unique arrangement of a rotary disc screen as the initial receptor of the waste material so that the shards and granular class of components do not reach the mill and undergo reduction to create a wear problem. Moreover, the present apparatus combines a number of material handling functions which have been heretofore carried out in separate items of equipment. This combination allows a significant reduction in the size of an enclosure for housing the apparatus.

What is claimed is:

1. In material classifying apparatus for processing waste material composed of uncrushable components, abrasive components and grindable components in a mill structure having an internal chamber provided with air inlet and material trap and outlet means in an air moving system for the internal chamber and material grinding means connected to the internal chamber of the mill structure for receiving the grindable components, the improvement comprising:
   (a) a rotary disc screen connected into the internal chamber of the material classifying apparatus, said rotary disc screen having an inlet end for receiving the collective composition of the waste material components and an outlet end in the internal chamber adjacent the air inlet means of the air moving system, said rotary disc screen operating to screen out the abrasive waste material components in advance of the remainder of the waste material composed of uncrushables and grindable components reaching the internal chamber for separation of the uncrushable components which collect in said air inlet trap adjacent said rotary disc screen outlet end; and
   (b) conveyor means adjacent said rotary disc screen for collecting and removing the screened out abrasive components before it enters the internal chamber to protect the material grinding means from processing abrasive components of the waste material.

2. In combination with a material classifying apparatus for separating materials that are different depending on gravitationally heavy uncrushable components, abrasive components and grindable components, the classifying apparatus having a mill structure with an internal chamber open to a material grinding mill and an air moving system connected to the internal chamber for separating air responsive grindable components, the air moving system having an air inlet and heavy material trap open to the internal chamber, the improvement comprising:
 (a) a rotary disc screen operably connected to the mill structure with an inlet end for receiving material to be classified by the classifying apparatus and a material delivery end opening to the internal chamber over the air inlet and heavy material trap, the rotary disc screen operating to screen out of the received material abrasive components for protecting the material grinding mill from encountering the abrasive material;
 (b) first conveyor means adjacent said rotary disc screen in position for collecting and removing the screened out abrasive components; and
 (c) other conveyor means adjacent the mill structure in position to collect the trapped heavy material and to collect the grindable components.

* * * * *